United States Patent [19]

Hensleigh

[11] 4,387,414
[45] Jun. 7, 1983

[54] DIAL ILLUMINATING SYSTEM

[76] Inventor: Robert H. Hensleigh, 8516 Harwood, Fort Worth, Tex. 76118

[21] Appl. No.: 275,666

[22] Filed: Jun. 22, 1981

[51] Int. Cl.³ .............................................. F21V 7/04
[52] U.S. Cl. ...................................... 362/31; 362/268; 362/331; 362/332
[58] Field of Search ................... 362/31, 268, 331, 332

[56] References Cited

U.S. PATENT DOCUMENTS 3,029,334  4/1962  Anderson et al. ................. 362/31
3,246,133  4/1966  Hensleigh .......................... 362/268
3,752,974  8/1973  Baker et al. ....................... 362/31

Primary Examiner—Stephen J. Lechert, Jr.
Attorney, Agent, or Firm—Jim Peppers

[57] ABSTRACT

Discloses an improved instrument dial illuminating system including a light transmitting optical element formed with a thickness diminishing in the vicinity of one edge of the optical element to the vicinity of an opposite edge of the element and with a prescribed generally convex surface extending from the thick edge to across the element. Profile is of configuration prescribed to cause light rays refracted within the element from a light source to be reflected from such surface at angles closer to normal with respect to a dial face located adjacent to the light source. Such surface of optical element may be formed with a localized regional surface located intermediate the edges of such element and formed of configuration designated to cause light rays refracted within such optical element from said light source to be reflected from such regional surface at angles closer to normal with respect to such dial face.

13 Claims, 3 Drawing Figures

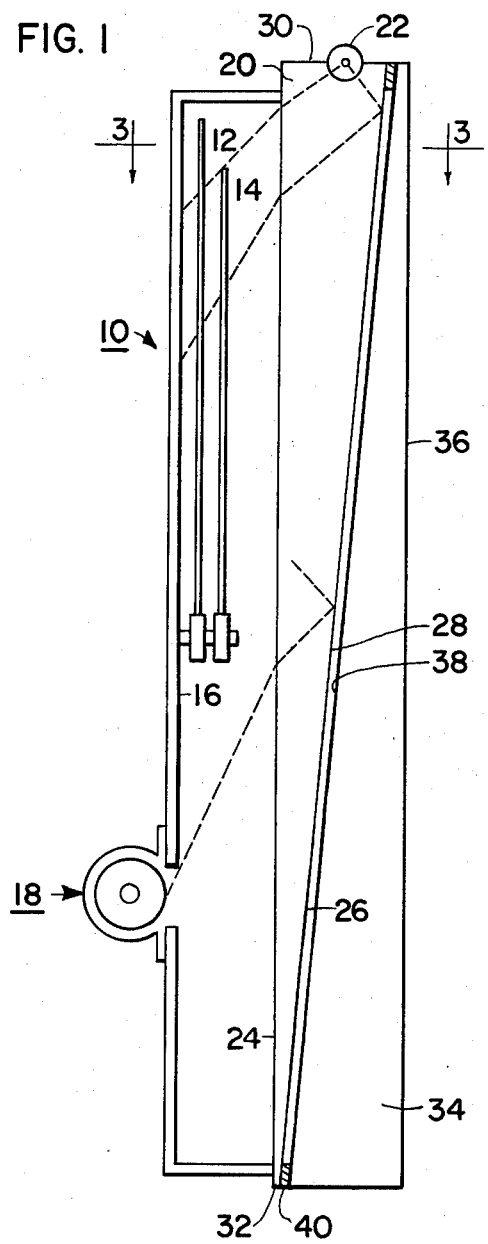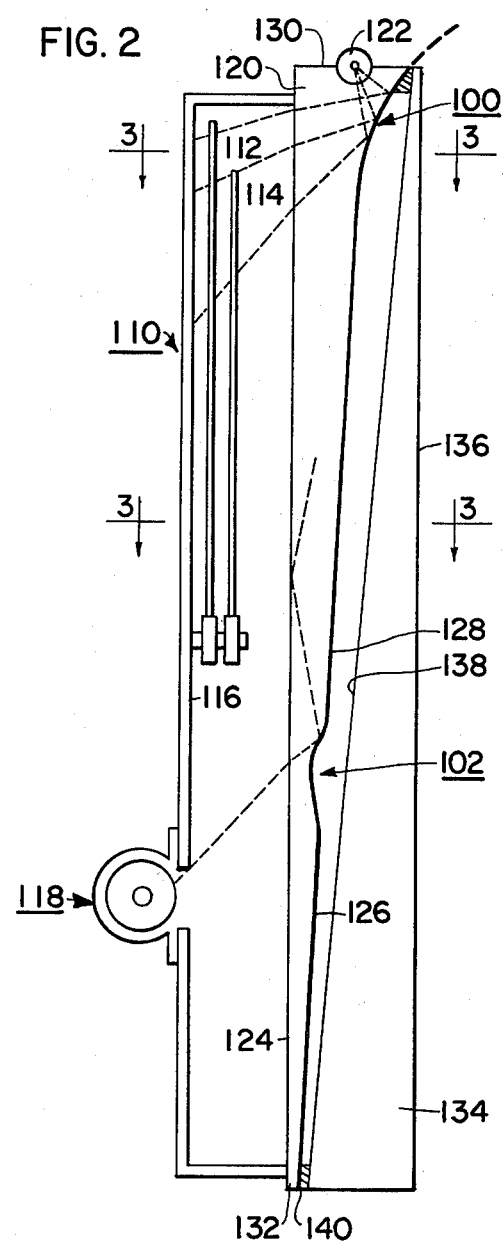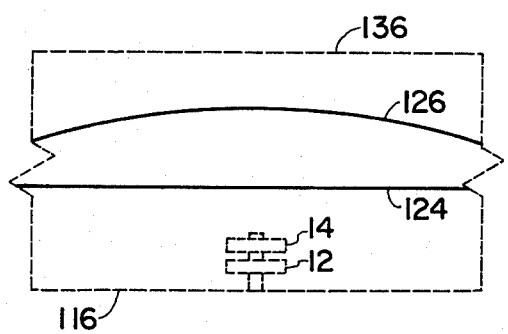

DIAL ILLUMINATING SYSTEM

This invention relates to illuminating systems for lighting panel dials and the like, and more particularly is an improvement to systems for evenly and efficiently distributing illuminating rays of light over an instrument dial face without extraneous light.

BACKGROUND OF THE INVENTION

When a ray of light passing through air strikes a plane surface of a transparent medium, part of the ray is refracted into the transparent medium. The incident reflected and refracted rays all lie in a common plane which is perpendicular to the surface of the medium in question. The normal is defined as a line perpendicular to the surface at a point where the ray strikes a transparent medium.

As measured from the normal, the angle of reflection equals the angle of incidence. The angle of refraction, as measured from the normal, is defined by Snell's law as $\sin I/\sin R = U$ where I is the angle of incidence, R is the angle of refraction, and U is the index of refraction of the medium in question. Except for the rays perpendicular to the surface, the angle of incidence is always greater than the angle of refraction.

For ordinary glass, which has a refractive index of about 1.5, a ray at grazing incidence is refracted into the glass at an angle of about 40 degrees. Reciprocally, a ray passing through the glass at an angle of 40 degrees from normal will emerge into air at grazing incidence to the surface of the glass; this angle is termed the critical angle for glass or any other transparent medium having the same refractive index.

If a ray passing through the medium in question should strike the surface at an angle greater than 40 degrees with respect to the normal it is obvious that the laws of refraction can no longer obtain, and the ray is totally reflected from the surface back into the medium. Depending upon its refractive index, there is a critical angle for every transparent medium; rays originating within the medium and striking a plane surface at an angle with respect to the normal greater than the critical angle are totally reflected within a medium.

The present invention utilizes the phenomenon of total internal reflection within parts of cones and cylinders, having complementary conical cavities, to achieve an even distribution of light over a surface to be illuminated and to capture certain transient light rays and divert the same from the line of sight of an observer of a surface so illuminated.

The most pertinent prior art to the present invention is U.S. Pat. No. 3,246,133, issued to the present inventor, and the disclosure of that patent is specifically incorporated herein by reference.

As set out in the prior patent, it is essential that an aircraft pilot have visual access to the dial faces of various meters and navigational instruments. However, an excess of transient light within the cockpit leads to a phenomenon commonly known as night blindness which is essentially the reduction of visual acuity for distant or faintly lighted objects external to the aircraft.

In addition to the obvious need for glare suppression, the problem involves the efficient distribution of illuminating light over the several dial faces so that information bearing rays may be provided with uniform intensity and without extraneous light which serves no useful function.

Part of the difficulty resides in the inverse square law of illumination from a point source. Without proper corrective measures as set forth herein, a light bulb positioned out of a pilot's line of sight above an instrument dial to achieve an indirect lighting effect tends to illuminate those surfaces nearest the bulb to a greater extent than more remote areas because the illumination thus provided is approximately inversely proportional to the square of the distance from the filament of the bulb. Consequently, uniform lighting can only be achieved by this method when the illuminated area is small in comparison to the distance from the bulb.

The illumination system disclosed in the prior art patent herein referenced has largely solved the foregoing problems and has been successfully utilized in many aircraft for many years. However, a problem in even light distribution has become manifest which will be described and which has been solved by the present invention.

OBJECTS OF THE INVENTION

An object of the present invention is to provide adequate and even distribution of light over all the surface of an instrument dial including the area of the dial immediately adjacent the illuminating light source.

Another object of the present invention is to provide adequate and even illumination of a rotary counter or the like which may be recessed into the face of the dial and thus not be adequately illuminated by prior art lighting systems.

SUMMARY OF THE INVENTION

The foregoing and other objects and advantages are attained in an illuminating system which includes a first light transmitting optical element formed with a thickness diminishing generally convex in contour from the vicinity of one thick edge of such first optical element to a circumference in the vicinity of an opposite thin edge of such first element, a first prescribed surface extending generally from such thick edge to along such circumference and across such first element; and a second surface extending generally radially in a plane across such first element from such axis to such circumference. A light source is positioned so as to cause rays of light to radiate into such one edge through such first element to such opposite edge. Such first surface is provided of configuration to cause light rays refracted within such first element from the light source to be reflected from such first surface and refracted through such second surface at angles closer to normal with respect to such second surface in a designated vicinity. Such first surface of the first optical element may be formed with a localized regional surface located intermediate such one edge and such circumference with the regional surface being formed of configuration designated to cause light rays refracted within the first optical element from the light source to be reflected from such regional surface and refracted through such second surface at angles closer to normal with respect to such second surface in the vicinity of the regional surface. The system may further include a second light transmitting optical element formed to be generally complementary with the first optical element so as to provide a composite structure having edges effectively of the shape of the first optical element and of configuration to cause light rays passing directly from the light source within such first element through such first surface to be substantially totally received and contained within such second optical element as refracted light rays. The optical element and the second optical element may be joined together with an air cavity situated and hermetically sealed therebetween.

BRIEF DESCRIPTION OF THE DRAWING

FIG. 1 schematically illustrates in a cross-sectional view of an instrument dial, such as an aircraft dial, taken from the side along the axis of the instrument pointer shaft and showing the lighting system of the referenced U.S. Pat. No. 3,246,133;and FIG. 2 schematically illustrates a cross-sectional view of the same dial as shown in FIG. 1 when equipped with the lighting system of the present invention;

FIG. 3 is an illustrative cross-sectional view as taken at line 3—3 of FIGS. 1 and 2 and showing typically a convex outer surface for the light transmitting optical element of the prior art and the present invention.

BRIEF DESCRIPTION OF THE PRIOR ART

Now referring to FIG. 1, there is shown in cross-section an indicator 10, such as disclosed in U.S. Pat. No. 3,246,133, which may be circular and which may be located in an aircraft instrument panel, for example.

As shown, the indicator 10 may have two indicator hands or pointers 12 and 14 rotatable about a common axis with appropriate indicia (not shown) printed or otherwise marked on the face of a dial 16. The indicator 10 may also include a totalizer counter 18 which is comprised of a number of totalizer wheels with each wheel displaying sequential indicia, for example. As shown, the counter wheels are usually recessed within the face 16 of the indicator 10 to an extent permitting clearance of the wheels from the dial.

Covering the dial 16 is a conical light dispersing optical element 20 shown to be tapered in profile with its thick end or edge 30 at the top and a thin end or edge 32 at the bottom as a segment or portion of a larger (not shown) circular generally cone shaped body. In optical connection at the thick end 30 of the dispersing element 20 is a light source 22 which may be an incandescent light bulb, for example.

As explained in the prior referenced patent, the dispersing element 20 is shaped or formed with a planar inner surface 24 and a conically shaped outer surface 26. The contour of the outer surface 26 is generally convex as typically shown in FIG. 3 and is shaped as a conical segment defined by the profile 28 of the outer surface 26 when the profile 28 is rotated as a radius about an axis located in the vicinity of light source 22.

For purposes of identification, it may be seen that the optical element 20 is thickest at an edge 30 where the light source 22 is located and thinnest at an opposite edge 32 shown at the bottom of the indicator 10.

As shown in FIG. 1, an optical element 34 is provided and mounted such that the light dispersing optical element 20 is positioned between the optical element 34 and the dial 16. The optical element 34 is provided with a planar face 36 and a contoured face 38. The planar face 36 of the element 34 is mounted such as to be substantially parallel to the inner surface 24 of the optical element 20. The contoured face 38 of the optical element 34 is formed such as to be generally complementary to the outer surface 26 of the optical element 20.

The contoured outer surface 26 of optical element 20 is usually mounted in spaced apart relationship from the contoured face 38 of the optical element 34 by means of an annular spacer member 40 such that the surfaces of face 38 and surface 26 are not in direct physical (interface) contact.

As mentioned in the referenced patent, some deviation between the surfaces of the conical surfaces 26 and 38 are generally acceptable without impairing the efficiency of the system and may actually be found to be advantageous for special illuminating effects.

In use, the light source 22 eminates a designated intensity of light rays, shown in part by the dashed lines in FIG. 1. The light rays are refracted back and forth between the surfaces 24 and 26 throughout the optical element 20 with a portion of such rays passing through the surfaces 24 and 26, depending on the angle of incidence that each ray impinges against a given surface. Thus, some of the rays are passed through the inner surface 24 to evenly illuminate a large portion of the dial 16. However, as can be seen by the dashed lines, the light rays in the vicinity of the light source 22 do not pass through the inner surface 24 near the upper end of the dial 16 to as great an extent as through the remainder of the surface 24. Thus, the area of dial 16 in the vicinity of pointer 12 as shown may receive inadequate and insufficient lighting, which may cause some of the indicia to be indiscernable, or may give a poor appearance to the even illumination of the dial. The purpose of the present invention is to rectify this problem and to provide adequate lighting in the upper part of the dial 16 near the light source 22.

As may also be seen, the totalizer counter 18 will receive light waves refracted within the optical element 20 and passed through the inner surface 24 but at angles such that the upper portion of the counter 18 may be insufficiently and inadequately lighted. A feature of the present invention will also serve to provide adequate lighting to this upper portion of the totalizer counter.

DESCRIPTION OF A PREFERRED EMBODIMENT OF THE PRESENT INVENTION

Referring to FIG. 2, it may be seen that most of the elements shown are common to the prior art as shown in FIG. 1 and, accordingly, like elements bear like numbers to the elements shown in FIG. 1 but carrying the prefix "1" for distinguishment. All the description, as previously applied to FIG. 1 to the elements of FIG. 1, is appicable to the embodiment of the invention shown in FIG. 2 with exception of the improvements as hereinafter described.

At the upper portion of the outer surface 128 near the light source 122, the surface 128 is modified into a composite concave/convex profile curve 100, as shown in FIG. 2, which merges into a convex surface contour 126 as shown in FIG. 3. The surface configuration of the optical element 120 in vicinity of the profile curve 100 is that of the curve 100 extending from the thick edge 130 as a convex counter as shown in FIG. 3, and varied to produce a designated configuration to the surface 126 as needed for appropriate light ray reflection.

The curvature of the profile 100, in the immediate vicinity of the light source 122, causes light rays eminating from the light source to impinge on the curved surface and reflect through the inner surface 124 at angles closer to normal, i.e., 90°, to the plane of the inner surface 124. Thus, light from the light source 122 may be reflected back into the vicinity of dial 16 very near the light source 122, as shown, and evenly illuminate the portion of the dial 16 previously supplied with insufficient illumination in the prior art illustrated in FIG. 1.

The curvature of the curve profile 100 may be set through routine experimentation and may or may not be a segment of a circular curve, depending on the geometry of the indicator 110 including the distance of the dial face 116 from the inner surface 124 and the location of light source 122.

A further feature shown in FIG. 2 is a profile curve and surface 102 formed into the contour of the outer surface 128 at an appropriate vicinity of the totalizer counter 118. As shown, light refracted between the surfaces 124 and 126 reach the reflective surface 126 at the curve 102 and are reflected through the inner surface 124 at angles closer to normal, i.e., 90°, and thereby provide illumination into the recess occupied by the counter wheels of counter 118 to clearly illuminate all of the counter 118 as may be visible through the dial 116.

The curve profile 102 may also be coordinated along with the profile 126 to form a convex portion across the outer surface of the optical element 120 as typified in FIG. 3, or simply may be formed into the face of the outer surface 126 in a vicinity only sufficient to properly illuminate the counter wheels of counter 118.

The gasket 140 is also provided to space apart the optical elements 120 and 134. As shown in this embodiment, the space between the surface 138 of optical element 124 may diverge considerably from the surface 126 of element 130, with the surface 138 remaining of rather simple configuration such as shown for surface 38 in FIG. 1.

The requisite for the optical element 134 is for light rays which pass through the outer surface 128, which have been refracted along through element 120 from the light source 122, will enter the optical element 134 and remain refracted within the element 134 without escaping out through the outer surface 136.

As necessary, some of the contour of surface 138 may need be modified to more closely approximate the outer surface of the element 120 including surfaces 100, 102, and 128 in order to properly contain the spurious light rays as necessary. As can be seen in FIG. 2, the optical element 120 has a thickness 130 at the light source 122 and a thin section 132 located opposite the thick section 130.

In summary, the illuminating system of the present improvement includes a first light transmitting optical element 120 formed with a thickness 130 diminishing as a generally convex contour from the vicinity of a thick edge 130 to a thin section 132 located at the opposite edge of element 120. A first prescribed surface 128, including a profile 100 merging into a contour 126 along the surface 128, extends generally from the thick edge 130 to along the opposite edge 132 and across the element 120. A second surface 124 extends generally radially in a plane across element 120 from the thick edge 130 to the opposite edge 132. A light source 122 is positioned so as to cause rays of light to radiate into edge 130 through the element 120 to the opposite edge 132. The profile 100, prior to merging into the contour 126, is provided of configuration prescribed to cause light rays refracted within element 120 from the light source to be reflected and refracted from surface 128 at curve 100 through surface 124 at angles closer to normal with respect to surface 124 in the vicinity of the edge 130.

As an added feature, the first surface 128 of element 120 may be formed with a localized regional surface 102 located intermediate such axis and the opposite edge 132 which is formed of configuration designated to cause light rays refracted within the optical element 120, from the light source 122, to be reflected and refracted from the regional surface 102 through surface 124 at angles closer to normal with respect to surface 124 in the vicinity of the regional surface 102.

The improved system may further include a second light transmitting optical element 134 formed to be generally complementary with the first optical element 120 so as to provide a composite structure having edges effectively of the shape of the optical element 120 and of configuration to cause light rays passing directly from the light source 122 within the element 120 through surface 126 to be substantially totally received and contained within optical element 134 as refracted light rays.

Another feature developed in the present invention is to bond the optical elements 120 and 134 (or elements 20 and 34) together into an integral composite unit to give the additional advantage of increased structural strength for the composite and also to hermetically seal the air cavity between the optical surfaces 128 and 138.

The additional strength of the composite structure permits much greater flexibility in the assembly of the instrument 10 and also in its installation. The hermetic seal prevents the entry of vision obscuring dirt or liquid condensate into the cavity which occasionally has been a problem with instruments of this kind.

One method of joining and sealing together the optical elements 120 and 134, as shown in FIG. 2, is to provide at least one of such elements, such as element 134, for example, with an integral spacer ferrule of shape substantially as shown for the spacer 140. Complementary ferrules which fit together may be provided on each of the elements 120 and 134, if desirable.

With the elements 120 and 134 placed together with such a ferrule or ferrules in substitute for the spacer 140, the composite structure is appropriately mounted in a commercially available ultrasonic welding apparatus, and the elements 120 and 134 thereby joined together through ultrasonic fusion of the contacting faces providing by such a ferrule or ferrules.

Another method of joining the optical elements 120 and 134 is to provide the spacer 140 (or spacer 40) of an appropriate semi-conductive material, such as an adhesive plastic impregnated with electrically conductive particles of filaments, for example, mounting the composite structure of the elements 120, 134, and 140 into a commercially available induction heating apparatus, and joining the elements 120 and 134 together through fusion of the plastic spacer 140 as caused by the inductive heating of the particles or filaments.

As will be seen by those skilled in the art, the embodiment herein disclosed may be modified and changed to accomodate varied conditions, all without departing from the purview of the invention as set forth in the appended claims.

I claim:
1. An illuminating system including:
    (a) A first light transmitting optical element (120) formed with:
        (1) a thickness diminishing generally from the vicinity of one edge (130) of said first element to a circumference in the vicinity of an opposite edge (132) of said first element;
        (2) a first prescribed surface (128) having a composite concave/convex profile (100) located adjacent said one edge and merging into a convex contour (126) extending generally from said one edge across said first element to said opposite edge;

(3) a second surface (124) extending generally radially in a plane across said first element from said one edge to said opposite edge;

(4) said prescribed surface being of configuration designated to cause light rays refracted within said first element from said light source to be reflected from said first surface at said profile and (refracted) passed through said second surface at angles closer to normal with respect to said second surface in the vicinity of said light source and said first edge, and also permitting passage of said light rays through said second surface throughout said optical element; and (b) a light source (122) so positioned as to cause rays of light to enter into said one edge and to radiate and refract through said first element to said opposite edge.

2. The system of claim 1 further including a second light transmitting optical element (134) formed to be generally complementary with said first element so as to provide a composite structure having edges effectively of the shape of said first element and of configuration to cause light rays passing from said light source within said first element through said first surface to be substantially totally received and contained within said second element as refracted light rays while permitting light rays passing through both said second surface and said first surface to pass through said second optical element.

3. The system of claim 1 wherein said first surface of said first element 102 is formed with a local regional surface located intermediate said one edge and said opposite edge designated to cause light rays refracted within said first element from said light source to be reflected from said regional surface and passed through said second surface at angles closer to normal with respect to said second surface in the vicinity of said regional surface.

4. The system of claim 3 further including a second light transmitting optical element (134) formed to be generally complementary with said first element so as to provide a composite structure having edges effectively of the shape of said first element and of configuration to cause light rays passing from said light source within said first element through said first surface to be substantially totally received and contained within said second element as refracted light rays while permitting light rays passing through said second surface and said first surface to pass through said second optical element.

5. The system of claim 2 wherein said first surface of said first element is formed with a local regional surface (102) located intermediate said one edge and said opposite edge with said regional surface being formed of configuration designated to cause light rays refracted within said first element from said light source to be reflected from said regional surface and refracted through said second surface at angles closer to normal with respect to said second surface in the vicinity of said regional surface.

6. The system of claim 3 wherein said regional surface is part of said prescribed surface.

7. The system of claim 3 wherein said regional surface is formed into a local portion of said first surface.

8. The system of claim 1 wherein the prescribed surface is formed as a composite concave/convex curve in the vicinity of said light source.

9. The system of claim 3 wherein said regional surface is formed as a curved depression into said first surface.

10. The system of claim 2 wherein said first optical element and said second optical element are joined together to form an integral composite unit defining a hermetically sealed air cavity disposed between said optical elements.

11. The system of claim 10 wherein said optical elements are bonded together with an ultrasonically fused joint.

12. The system of claim 10 wherein said optical elements are joined together through a semi-conductive spacer member (140) respectively bonded to each said optical element through an electrically inductive fused bond.

13. An illuminating system including:
(a) a first light transmitting optical element (120) formed with:
(1) a thickness diminishing generally from the vicinity of one edge (130) of said first element to a circumference in the vicinity of an opposite edge (132) of said first element;
(2) a first prescribed surface (128) extending generally from said one edge across said first element to said opposite edge; and
(3) a second surface (124) extending generally radially in a plane across said first element from said one edge to said opposite edge;
(4) a local regional surface (102) formed with said first surface and located intermediate said one edge and said opposite edge;
(5) said regional surface being of configuration designated to cause light rays refracted within said first element from said light source to be reflected from said regional surface and passed through said second surface at angles closer to normal with respect to said second surface in the vicinity of said regional surface; and (b) a light source (122) so positioned as to cause rays of light to enter into said one edge and to radiate and refract through said first element to said opposite edge.

* * * * *